April 8, 1969  R. L. HILL  3,437,195
PACKAGING
Filed Aug. 24, 1967  Sheet 1 of 2
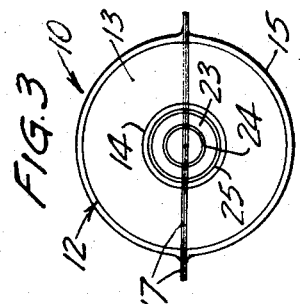
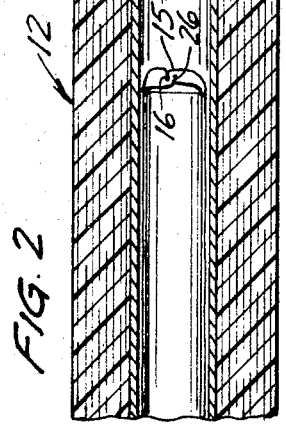
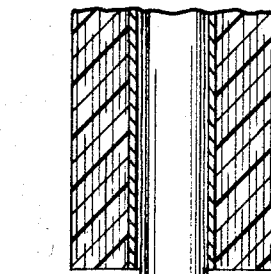
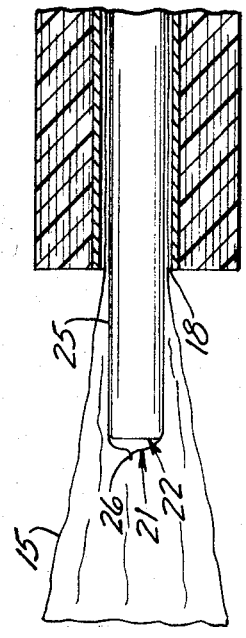
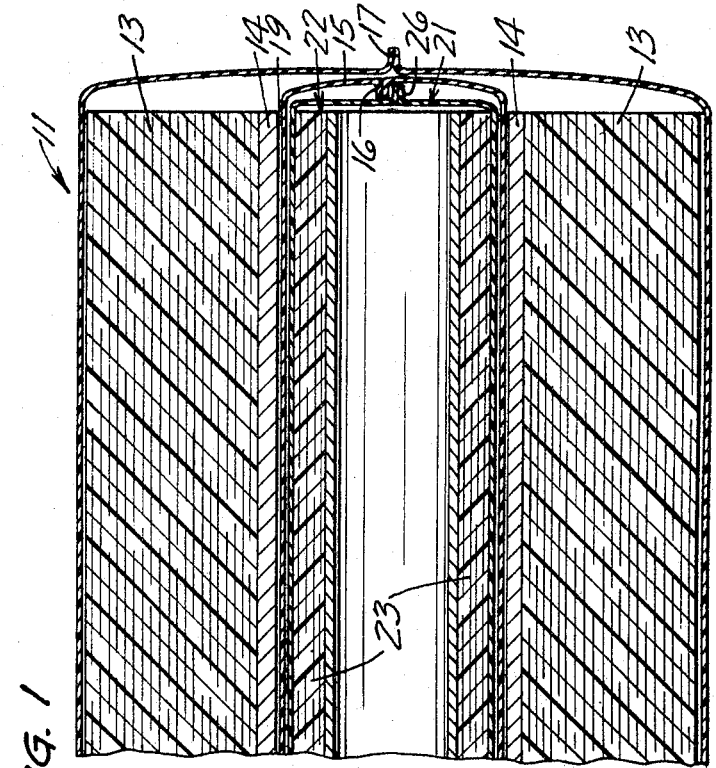
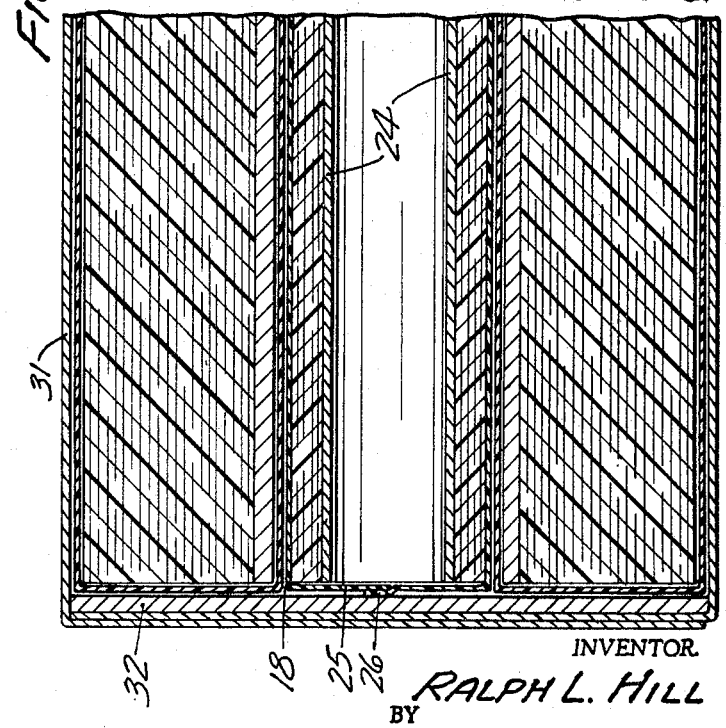
INVENTOR.
RALPH L. HILL
BY
Carpenter, Kinney & Coulter
ATTORNEYS April 8, 1969     R. L. HILL     3,437,195
PACKAGING
Filed Aug. 24, 1967     Sheet 2 of 2
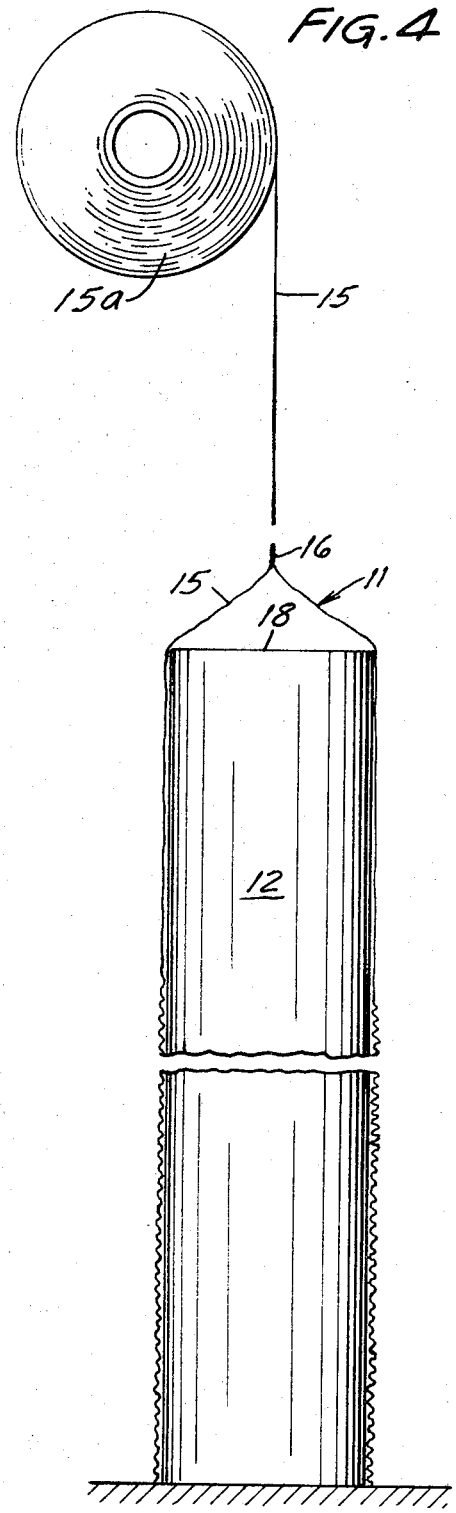
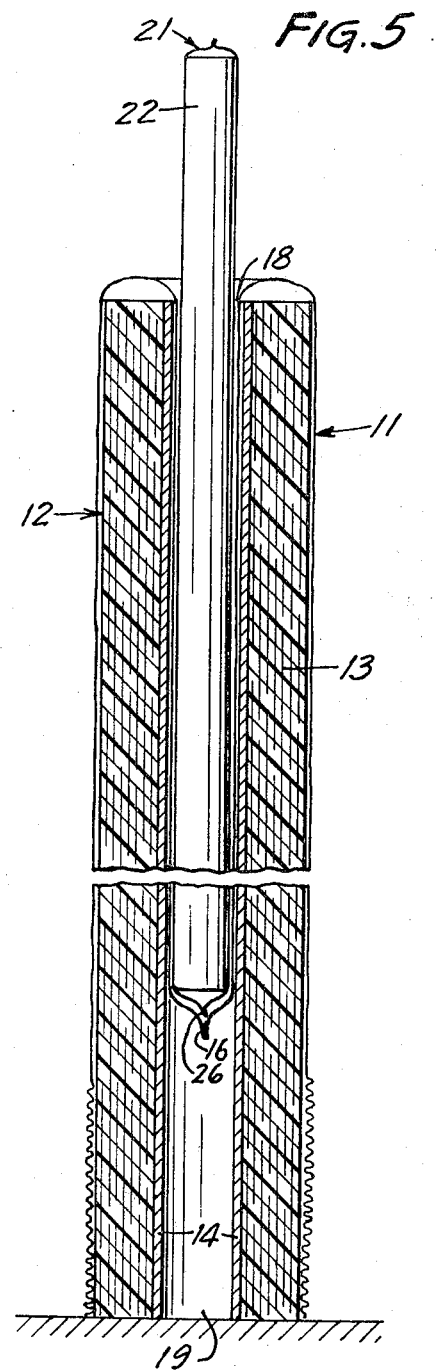
INVENTOR.
RALPH L. HILL
BY
Carpenter, Kinney & Boulter
ATTORNEYS United States Patent Office 3,437,195
Patented Apr. 8, 1969

1

3,437,195
PACKAGING
Ralph L. Hill, St. Paul, Minn., assignor to Minnesota Mining & Manufacturing Company, St. Paul, Minn., a corporation of Delaware
Continuation-in-part of application Ser. No. 583,503, Sept. 29, 1966. This application Aug. 24, 1967, Ser. No. 672,409
Int. Cl. B65d 79/00; B65b 55/00
U.S. Cl. 206—47                         5 Claims

ABSTRACT OF THE DISCLOSURE

A hermetically sealed package comprising a first elongate annular article hermetically sealed in a plastic wrapper and a compositionally identical second elongate article hermetically sealed in a plastic wrapper and disposed within the central cavity of the first article. The configuration of the package is such that the second article can be readily removed from the package for testing purposes without destroying the hermetic seal of the first article; also, a method for producing the hermetically sealed package.

---

This is a continuation-in-part of my application Ser. No. 583,503, filed Sept. 29, 1966, now abandoned.

The present invention relates to novel packaging. More specifically, the invention relates to a packaged product and especially a hermetically sealed package product which permits retrieval of a test sample therefrom without destroying the hermetic seal and to the method of packaging.

The packaging industry has long been acquainted with the advantages of hermetically sealing packages in order to protect the packaged product from loss of volatile components, contamination or exposure to atmospheric moisture. The ready availability of plastic packaging films, especially the heat-sealable films, has resulted in the widespread packaging of products in hermetically sealed bags, even products not ordinarily so packaged. However once such a package is opened, the hermetic seal is lost and the contents of the package are exposed to the atmosphere.

The present invention finds particular utility in the packaging of low temperature curing heat-sensitive bonding films which have relatively short shelf-lives at room temperatures, typically those which cure at temperatures from 75° to 250° F. These heat-sensitive bonding films are used extensively in the aircraft industry in bonding the aircraft skin to the structural elements and in forming component parts of aricraft. Due to the critical bonding requirements of such use, it is the practice of the industry to test each roll of bonding film upon receipt from the manufacturer and again prior to its actual use.

In view of the short shelf-life of these heat-sensitive bonding films, the film rolls which are approximately 36 inches wide and 36 yards to 72 yards long heretofore have been typically sealed in polyethylene bags, packed in a specially coated waterproof cardboard carton and stored or shipped at 0° F. or lower temperatures. Shipment is usually made in insulated shipping containers containing Dry Ice. Upon receipt of such shipments of heat-sensitive bonding film, a sample from each roll is removed and tested. This testing procedure makes it necessary to warm up the refrigerated rolls to room temperature before opening the cartons and the sealed bags to recover a test sample of about one yard of film. Warmup of the rolls in the sealed waterproof cartons is necessary to avoid moisture condensation on the rolls during the warmup period which usually requires the greater part of a day. It can be seen that this is a cumbersome procedure since the rolls generally range in weight from 40 to 80 pounds and more importantly, the product is exposed to atmospheric mois-

2 ture and warm up to room temperature with a consequent loss of approximately one day of shelf-life at room temperature.

It is, therefore, much to be desired to provide a package whereby the required test sample can be secured without the necessity of exposing the entire roll of film to the atmosphere and for warming up the entire roll in order to secure such a sample.

Accordingly, an object of the present invention is to provide a novel method of packaging whereby a test sample of the packaged product can be removed without breaking open the hermetic seal of said package.

Another object is to provide a novel package from which a test sample of the packaged product can be immediately and simply removed therefrom without breaking the seal on the package.

These and other objects and advantages will become apparent to those skilled in the art from the following detailed description and disclosure of an illustrative embodiment, especially in light of the accompanying drawings, wherein like numerals refer to corresponding parts in the several diagrammatic views, and in which:

FIGURE 1 is a sectional view, partly broken away, showing a completed hermetically sealed package of heat-sensitive bonding film packed in a waterproof coated cardboard carton;

FIGURE 2 is a sectional view, partly broken away, showing a roll of heat-sensitive bonding film in the process of being packaged to form the package of FIGURE 1;

FIGURE 3 is an end view of a hermetically sealed package of heat-sensitive bonding film according to the present invention;

FIGURE 4 is a side view, partly broken away, showing a roll of heat-sensitive bonding film in the process of being packaged to form the package of FIGURE 1;

FIGURE 5 is a sectional view, partly broken away, showing a further step in processing the package of FIGURE 4.

Referring now to the drawings, the illustrated embodiment of the present invention comprises a package 10 including a separate hermetically sealed package 11 containing a roll 12 of heat-sensitive bonding film 13 and a separate hermetically sealed package 21 containing a sample roll 22 of heat-sensitive bonding film 23 taken immediately adjacent to the bonding film 13 in roll 12. The heat-sensitive bonding film 13 is convolutely wound on a conventional 3 inch inside diameter paper core 14.

In packaging the roll 12 of heat-sensitive bonding film 13, a heat-sealable bag 15, typically formed from a tube of polyethylene five mils thick which is heat-sealed at one end, somewhat in excess of twice the length of the core 14, is utilized. It has been found that for a roll containing approximately 36 yards of heat-sensitive bonding film 13, the bag should be twice the length of the core plus 12 inches. The sealed end 16 of the bag 15 is inserted into end 18 of core 14, e.g., by being pushed in with sample roll 22 as hereinafter described, until it abuts the imaginary plane at the opposite end 19 of said core 14. The open end of the bag 15 is thereafter inverted over the roll 12 of heat-sensitive bonding film 13 thereby to completely enclose said roll 12 in said bag 15; the inverted bag 15 is pulled tightly over the roll 12 and then evacuated and heat-sealed in a conventional manner at point 17. In this manner, the roll 12 of heat-sensitive bonding film 13 is hermetically sealed.

Heat-sensitive bonding film 23, identical in every respect to heat-sensitive bonding film 13, approximately one or two yards long, is convolutely wound onto a conventional one and one-half inch inside diameter paper core 24 having approximately the same length as core 14 to serve as sample roll 22. Sample roll 22 is approximately 2 to 2½ inches in diameter and will be readily accommodated within the 3 inch inside diameter of core 14. Sample roll 22 is then packaged in a heat-sealable bag 25 of the same material as bag 15 and evacuated and heat-sealed.

The hermetically sealed package 21 containing roll 22 of heat-sensitive bonding film 23 is utilized in inserting the sealed end 16 of bag 15 into the interior of core 14 by placing end 16 against end 26 of package 21 and inserting package 21 the full length thereof into the interior of core 14. Package 21 will then be held in frictional engagement with those portions of bag 15 disposed against the inner periphery of core 14.

Another especially convenient method of packaging the roll 12 of heat-sensitive bonding film 13 is shown in FIGURES 4 and 5. A supply roll 15a of heat-sealable bags 15 scored to the proper length is suitably mounted above a packaging station. A bag 15 is placed over an upright roll 12 of heat-sensitive bonding film 13 so that the sealed end 16 is adjacent the upper end 18 of roll 13 as shown in FIGURE 4. It will be remembered that bag 15 is somewhat in excess of twice the length of core 14; because of this fact, the open end of bag 15 and the portion adjacent thereto remains gathered at the lower end of roll 12. The sealed end 16 of the bag 15 is then inserted into end 18 of core 14 by being pushed in with sample roll 22, as hereinbefore described. As the sealed end 16 of bag 15 is inserted into core 18, the gathered portion of the bag 15 is pulled upwardly to allow the sealed end of bag 15 to be inserted into core 14 until it abuts the imaginary plane at the lower end 19 of said core 14. The roll 12 is then laid on its side and the open end of bag 15 is pulled tightly over roll 12 and then evacuated and heat-sealed in a conventional manner.

It is, of course, possible to insert end 16 of bag 15 into the interior of core 14 by other readily obvious means. In this event, hermetically sealed package 21 is merely inserted into the interior of core 14 through end 18.

The resulting package 10 is then boxed in a snugly fitting specially coated waterproof cardboard carton 31. The ends of package 10 are protected against damage in storage and shipment by pads 32 which may be formed of cardboard and which are placed against the ends of the package 10 and the interior of the ends of carton 31.

The cartons 31 are then stored at temperatures of 0° F. or lower. Shipment of the cartons is accomplished in the conventional manner, i.e., in insulated shipping containers containing Dry Ice. When such cartons 31 are received, they can be immediately opened while still cold and the package 21 containing sample roll 22 removed therefrom. The carton 31 containing package 11 can be immediately resealed and dispatched for cold storage. The sample roll 22 hermetically sealed in package 21 can then be allowed to warm up to room temperature without fear of moisture condensation on the heat-sensitive bonding film 23 from the ambient air. Significantly, the roll 12 of heat-sensitive bonding film 13 has not been exposed to the atmosphere since it remains hermetically sealed in bag 15. Nor has it been necessary to warm up the entire roll of bonding film as in the past, thus extending the shelf-life of the film.

An additional advantage realized with the packaging method of the instant invention resides in the manner of placement of polyethylene bag 15 over and around roll 13 so that a "skin-tight" fit is achieved when the bag is evacuated and hermetically heat-sealed. In the prior art method of packaging such rolls, the rolls were simply placed within bags and sealed with the consequent entrapment of air within the confines of the 3 inch core; this entrapped air tended to contract during Dry Ice shipment resulting in undue strain on the film at the open ends of the core which on occasions resulted in rupture of the film at these points, thus destroying the integrity of the package.

It was previously noted that each roll of bonding film is tested upon receipt and again prior to its actual use by the aircraft manufacturer. To facilitate the retrieval of a test sample of the bonding film for pre-use tests, it is possible to include two sample rolls 22 in package 10, each sample roll then being approximately half the width of roll 12. Each sample roll 22 would, of course, be separately hermetically sealed and the two packages 21 will preferably be interconnected as with a tab so that removal of the first sample roll 22 from the interior of core 14 will also result in the second sample roll being partially pulled out of the core and positioned with its outer end adjacent to opening 18 for easy removal thereof.

Although the invention has been illustratively described with particular reference to packaging for an annular article requiring a hermetic seal and demanding storage conditions, various other uses, applications and modifications of the embodiment described, but which are equivalent and part of the invention hereof, will become apparent to one skilled in the packaging art. These are contemplated.

I claim:
1. A hermetically sealed package which permits retrieval of a test sample therefrom without destroying the hermetic seal comprising a first elongate annular article,
a compositionally identical second elongate article slidably fitting within the central cavity of said annular article,
an elongate plastic wrapper of a length substantially greater than said annular article disposed thereabout,
said annular article being positioned against one end of said wrapper, the wrapper being disposed about the external periphery of said annular article and against the inner periphery thereof within said cavity, with its other end abutting said first end,
said second article being inserted in said central cavity and frictionally engaging the portion of said wrapper lying against said inner periphery of said annular article and holding said wrapper in place within said cavity.
2. A package according to claim 1 wherein said second elongate article is annular and is hermetically sealed in a plastic wrapper.
3. A method of hermetically sealing a package containing a plurality of articles which permits retrieval of an elongate article such as a test sample therefrom without destroying the hermetic seal of the remaining articles, comprising the steps of
placing a first elongate article within a first wrapper and evacuating and sealing said wrapper,
providing a second elongate wrapper having a closed end and a length substantially greater than the length of a second elongate annular article to be wrapped,
said second elongate annular article having an inner diameter greater than the greatest diameter of said first elongate article,
placing said second wrapper around one end and the radially outermost surface of said annular article and within the central cavity of said annular article so that the closed end of said second wrapper is adjacent the other end of said annular article and the portion of said second wrapper adjacent its closed end is disposed against the inner periphery of said annular article and another portion of said second wrapper is disposed against the external periphery of said annular article,
placing said hermetically sealed first article in said central cavity so that it frictionally engages the portion of said second wrapper lying against said inner periphery of said annular article and holds said second wrapper in place within said cavity,
drawing the remaining portion of said second wrapper about the other end of said annular article, and
evacuating and sealing said second wrapper.
4. A method of hermetically sealing a package which permits retrieval of a test sample therefrom without destroying the hermetic seal comprising the steps of placing a first elongate article within a heat-sealable wrapper and evacuating and heat-sealing said wrapper, placing one end of said hermetically sealed article against the heat-sealed end of an elongate second heat-sealable wrapper, said second wrapper having a length substantially greater than the length of a second elongate annular article to be wrapped, inserting said end of said first article together with said second heat-sealable wrapper into the central cavity of said second annular article its full extent so that said second wrapper is disposed against the inner periphery of said annular article, inverting said second wrapper at about its midpoint and drawing it transversely over said second annular article so that the remaining length of said second wrapper is disposed against the outer periphery of said annular article with its open end abutting said first heat-sealed end, and evacuating and heat-sealing said second wrapper.

5. A method of hermetically sealing a package which permits retrieval of a test sample therefrom without destroying the hermetic seal comprising the steps of placing a first elongate article within a heat-sealable wrapper and evacuating and heat-sealing said wrapper, loosely placing an elongate second heat-sealable wrapper having a length substantially greater than the length of a second elongate annular article to be wrapped about the external periphery of said annular article so that the heat-sealed end of said second wrapper abuts one end of said annular article, placing one end of said hermetically sealed first article against the heat-sealed end of said second wrapper, inserting said end of said first article together with said second heat-sealed wrapper into the central cavity of said annular article its full extent so that a portion of said second wrapper is disposed against the inner periphery of said annular article, drawing the remaining portion of said second wrapper completely about said annular article until its open end abuts said first heat-sealed end, and evacuating and heat-sealing said second wrapper.

References Cited

UNITED STATES PATENTS

| 2,345,190 | 3/1944 | Freund | 206—47 |
| 2,673,432 | 3/1954 | Haw | 53—204 |
| 2,814,382 | 11/1957 | Lassiter | 53—22 |

TRAVIS S. McGEHEE, *Primary Examiner.*

U.S. Cl. X.R.

206—59; 53—13, 22